Aug. 23, 1966     J. SARACENI ETAL     3,268,767
SANITARY AND PROTECTIVE COVERING FOR SHOES
Filed July 3, 1964     3 Sheets-Sheet 1
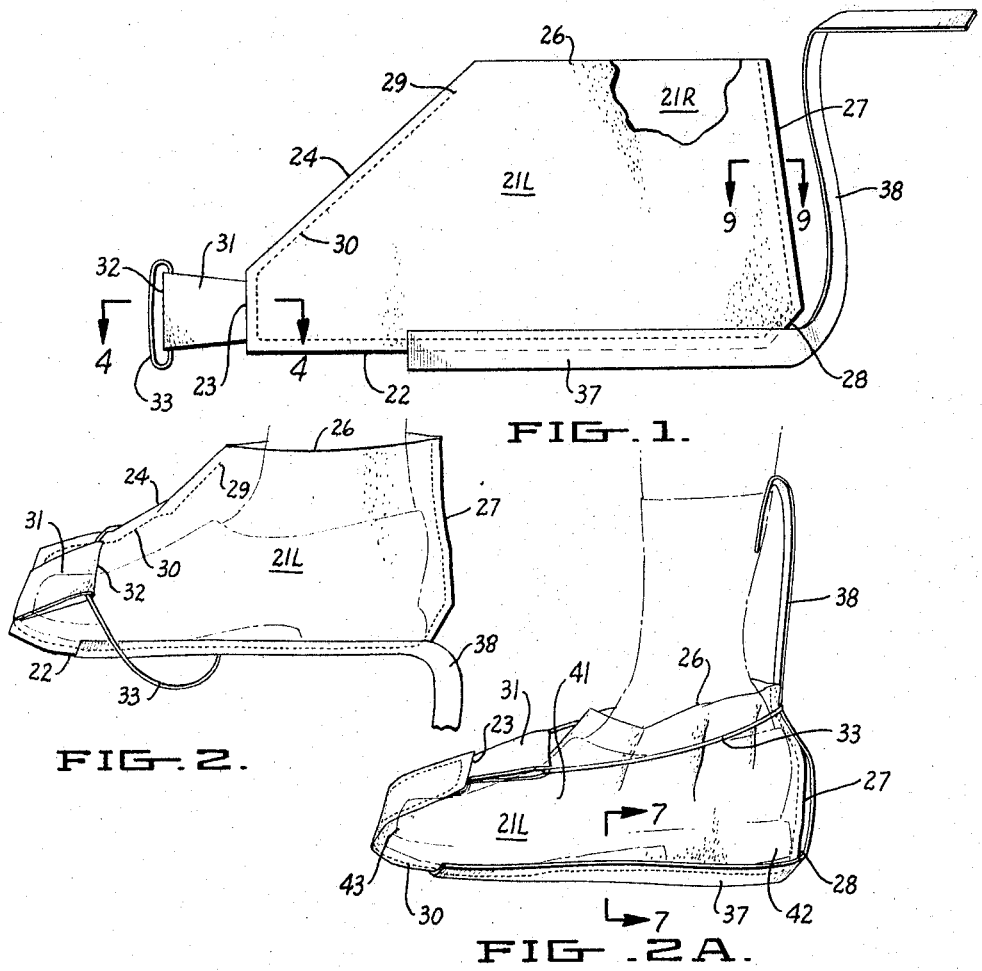
FIG. 1.
FIG. 2.
FIG. 2A.
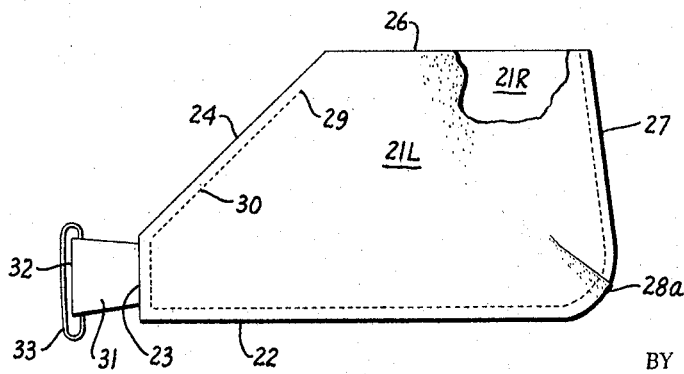
FIG. 3.
INVENTORS
HAROLD ZIMMON
JOSEPH SARACENI
BY
Julian Caplan
ATTORNEY

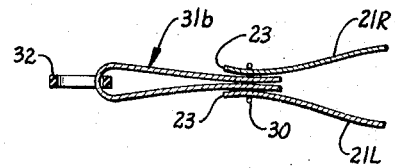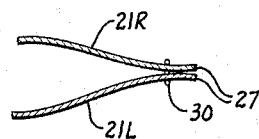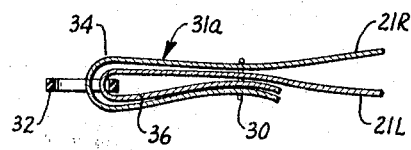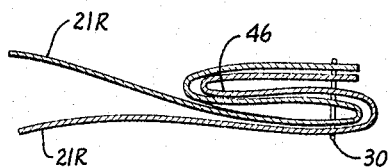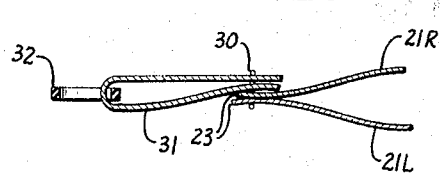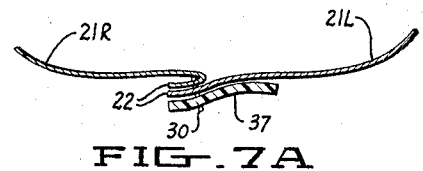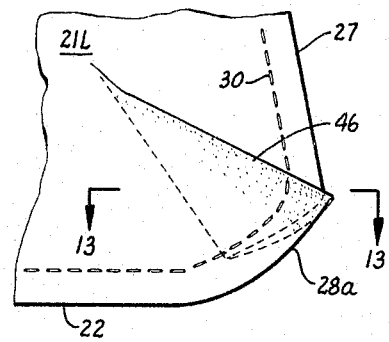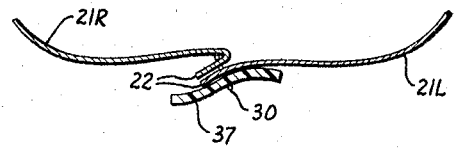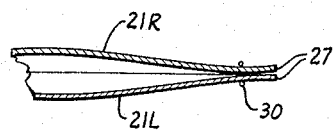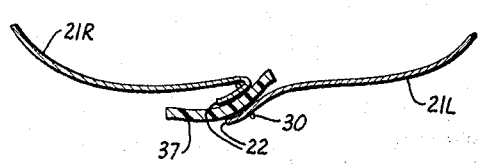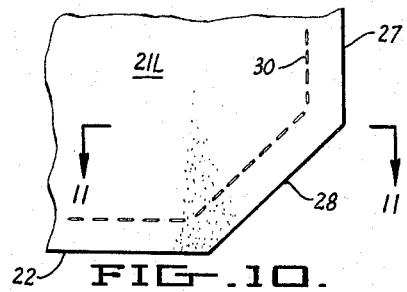

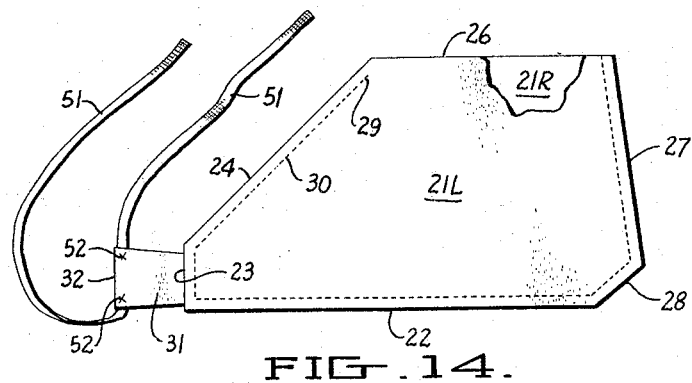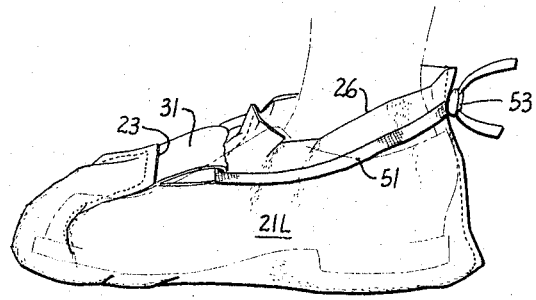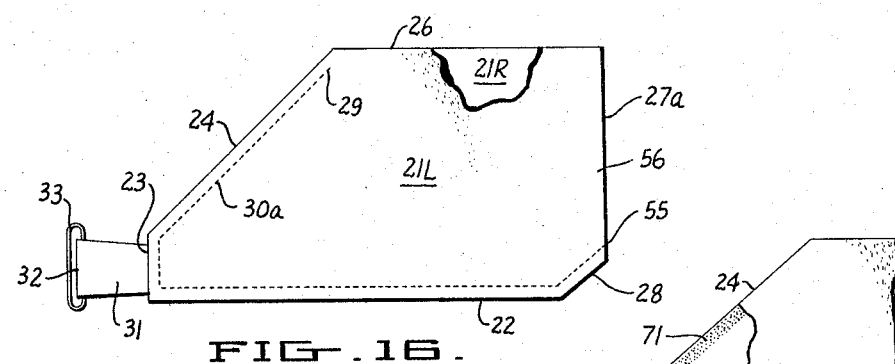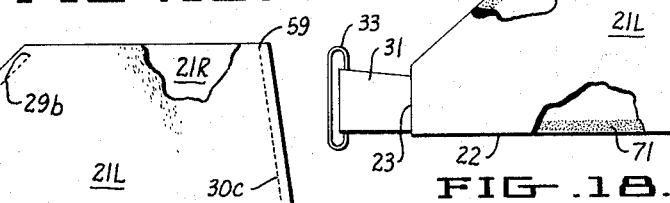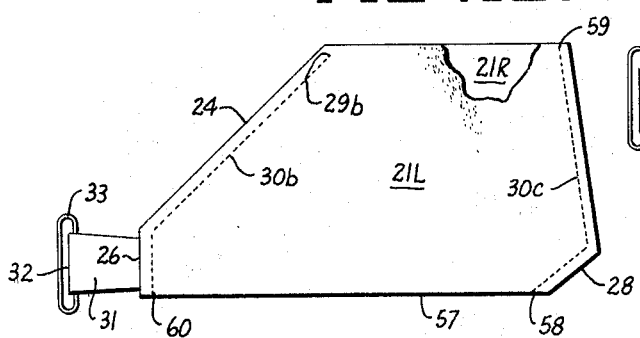

United States Patent Office 3,268,767
Patented August 23, 1966

3,268,767
SANITARY AND PROTECTIVE COVERING
FOR SHOES
Joseph Saraceni and Harold Zimmon, both of Redwood City, Calif., assignors to Zimmon & Company, Inc., Belmont, Calif.
Filed July 3, 1964, Ser. No. 380,180
21 Claims. (Cl. 317—2)

This invention relates to a new and improved sanitary and protective covering for shoes and is a continuation-in-part of co-pending patent application Ser. No. 359,356, filed April 13, 1964, for sanitary shoe wrapper.

Shoe coverings of the type of the present invention have particular application in sterile rooms in hospitals, commonly known as "burn rooms," and satisfy needs in such establishments for covering the shoes of attendants to prevent dust on the shoes from contaminating the atmosphere in the room. The invention further has application in areas requiring patient isolation to prevent contamination of shoes and cross-contamination of patients.

Shoe coverings are also used in cast rooms where plaster of Paris cast are applied and where table drippings are likely to fall upon the shoes of the doctors and attendants and permanently harm the same.

By the addition of a strip of conductive material, or by impregnating all or part of the covering with a conductive substance, the present shoe covering may be used in hospital surgeries, or in any other establishment where static electricity creates a hazard. The conductive covering discharges static electricity which might tend to build up in the body of the attendant and thus prevent explosions of anaesthetics and other hazardous substances.

Shoe coverings may further be used in any commercial establishment where a shoe covering is desirable or necessary. A typical example of such use is by show window dressers who commonly remove their shoes in order to prevent floor dust from detracting from the appearance of the carpeting frequently installed in show windows.

A particular feature and advantage of the present invention is its adaptability over a wide range of shoe sizes, while still fitting snugly and neatly over the shoe. Thus, the inventory of coverings which must be stocked is reduced.

Heretofore, most shoe coverings have been of a slipper, shoe or boot shape formed with more or less conventional heels and toes. The present invention is not conventional in the formation of the toe and this simplifies the manufacture and makes the device much less expensive and more versatile in application.

Prior shoe coverings have used various means for attachment of ties and other fastening means to secure the covering in place which are labor consuming and thus expensive to apply and also tend to rip off in use. The present invention uses a unique front tab at the toe through which the fastening means passes, which eliminates much of the labor involved in attachment as well as any problem of the tie ripping off at the time of application or during use.

Another advantage of the invention is that it is so constructed that it can be conveniently applied over street shoes with little time or effort consumed. Little or no skill is required in order to enable the user to apply the device and fasten the same on the shoe. Further, if a conductive strip is used in connection with the covering, the proper positioning of the strip so as to ground the body of the wearer is facilitated.

A further feature of the invention is the facility with which it may be fabricated. Thus, the material may be cut with standard die cutting machines or fabric cutting machines. Further, the device may be assembled with the use of standard commercial sewing machines.

Other objects of the present invention will become apparent upon reading the following specification and referring to the accompanying drawings in which similar characters of reference represent corresponding parts in each of the several views.

In the drawings:

FIG. 1 is a side elevational view of one form of the invention.

FIG. 2 is a perspective view, showing the device partially installed on a street shoe.

FIG. 2A is a view similar to FIG. 2, showing completion of installation.

FIG. 3 is a view similar to FIG. 1, of a modified construction.

FIG. 4 is a fragmentary enlarged sectional view of a portion of FIG. 1, taken substantially along the line 4—4 of FIG. 1.

FIG. 5 is a view similar to FIG. 4, of a modification.

FIG. 6 is a view similar to FIG. 4, of still another modification.

FIG. 7 is a fragmentary sectional view taken substantially along the line 7—7 of FIG. 2A.

FIG. 7A is a view similar to FIG. 7, of a modified construction.

FIG. 8 is a view similar to FIG. 7, of still another modified construction.

FIG. 9 is a fragmentary sectional view, taken substantially along the line 9—9 of FIG. 1.

FIG. 10 is an enlarged fragmentary side elevational view of a portion of FIG. 1, somewhat modified in construction.

FIG. 11 is a sectional view, taken substantially along the line 11—11 of FIG. 10.

FIG. 12 is a view similar to FIG. 10, of still another modification.

FIG. 13 is a sectional view taken substantially along the line 13—13 of FIG. 12.

FIG. 14 is a view similar to FIG. 1, of a modified construction.

FIG. 15 is a perspective view of the device of FIG. 14 installed on the foot.

FIGS. 16 and 17 are views similar to FIG. 1, of still further modified constructions.

FIG. 18 is a view similar to FIG. 1, showing the use of glue to hold the parts in assembled position, as distinguished from stitching.

The present invention provides a wrapping of a sanitary or non-contaminating nature of simple and inexpensive construction. The body of the device may be formed of a wide variety of materials. Non-woven materials, such as paper or yarn-reinforced cellulose material and non-woven fabrics, are particularly suitable for the present invention by reason of their low cost. Such materials may be received from the manufacturer in webs or rolls of extended widths and lengths from which a plurality of blanks may be cut with economy of material. Cloth, such as light canvas, muslin, or almost any fabric, may be used. Similarly, plastic may be used, depending upon the end use of the covering.

In some of the forms of the invention hereinafter described in detail, it is desirable to ground the wearer to the floor and for such purpose the entire device may be formed of a conductive material, as by impregnating with conductive substance such as a suspension containing graphite. Alternatively, spots of conductive substance may be printed or otherwise applied to specific locations on the body blanks, the remainder of the body being left non-conductive. Alternatively, and particularly as shown in certain of the accompanying drawings, a conductive strip is sewn, glued, stapled, or otherwise attached to the covering and is formed of a conductive material. A preferred conductive material is a conductive polyolefin of a thickness of two or three mils, one such product being known as "Valostat," manufactured by Custom Materials, Inc., of Chelmsford, Massachusetts. Aluminum foil tape is also suitable for such purpose.

Turning to the form of the invention illustrated in FIG. 1, there are provided left and right body blank members 21L, 21R, respectively, each being a flat piece of material of the type heretofore described. The two halves are similar in shape. Each has a substantially horizontal bottom edge 22, a front or toe edge 23 substantially perpendicular to bottom edge 22 of a relatively short length, an upwardly-rearwardly slanted instep edge 24 disposed at an angle of approximately 45° with respect to edge 22, a top edge 26 generally parallel to bottom edge 22 and spaced therefrom about 7½ inches and of a length approximately two-thirds the length of bottom edge 22, and downwardly-rearwardly slanted back edge 27 disposed at an angle of about 70° with respect to the horizontal. The rear bottom corner 28 is cut off at about a 45° angle to edge 22 to form a heel pocket. The two halves of the body 21L, 21R may be stitched together by means of thread stitching 30 which commences at a point 29 spaced slightly inward from instep edge 24 and near the top of edge 24 and continues downwardly parallel to edge 24, thence parallel to toe 23, and parallel and spaced upwardly from bottom 22, around the corner 28 in an arc, and up the back 27, terminating at the top of back 27.

A loop 31, comprising a piece of material preferably the same as the body portions, is inserted behind portion 21R (see FIG. 4) and is attached to the body portion by the same stitching 30 as stitches the two halves together. As viewed in side elevation in FIG. 1, tab 31 comprises two integral truncated triangular folded-over halves folded at the front edge 32. Caught in loop 31 is a rubber band 33. Directing attention to FIG. 5, it will be seen that as an alternate construction the portions 21R, 21L, may have integral forward extensions 34, 36, respectively, which form tab 31a. In FIG. 6, tab 31b is similar to tab 31 in shape and construction, but its inner end is tucked between the forward edges 23 of body portions 21R, 21L, rather than being on the outside thereof as in FIG. 4.

In instances where it is desired that the device be made conductive, an elongated strip 37 of conductive material is positioned lying on one side, such as side 21L, with its lower edge parallel to but spaced below bottom edge 22 commencing at a point about two-thirds of the distance rearward of the front end of bottom edge 22 and extending rearwardly beyond corner 28 in an elongated tuck-in tab 38. The bottom stretch of stitching 30, which secures parts 21R, 21L together, also secures strip 37 to the bottom of the device.

In use, the shoe of the wearer is inserted between the halves 21L, 21R through the top opening. Generally, the covering will be considerably larger than the shoe 41, and hence the heel 42 of the shoe is pushed rearwardly into the heel pocket at corner 28. The front of the covering is pulled up so that it is in tight contact with the toe 43 of the shoe, tab 31 lying over the instep of the shoe and the sides 21L, 21R being creased to generally conform with the shape of shoe 41. Thereupon the rubber band 33 is stretched downward below the sole of shoe 41 and brought around back of heel 42 thereof into the final position shown in FIG. 2A, where it engaged behind the ankle of the wearer. Thus, in installing the rubber band 33 in its final position, it will be seen that the tab 38 is automatically drawn up behind the shoe so that its top end can be tucked into the top of the sock of the wearer, as shown in FIG. 2A. In this way, the body of the wearer is grounded through strip 37 to the floor. The device may be installed on either the right or the left shoe and will accommodate a wide range of different shoe sizes. When used by women, where it is not possible to tuck the extended tab 38 into the top of a sock, the tab 38 may be brought inside and also inside the street shoe to establish electrical contact through the stocking.

A modified form of the invention is shown in FIG. 3, where no conductive strip is used.

Instead of the rear corner being rounded, corner 28a may be formed with a tuck 46, the details of which are illustrated in FIGS. 12 and 13. In this construction, the blank from which the sides 21L, 21R are formed have straight rather than angled rear bottom corners and the rounded heel corner 28a is formed by tucking the material into a V-shaped dart.

In FIG. 7A, the strip 37 is sewn level with bottom edges 22, rather than with its bottom edge depressed below edge 22. In the modification of FIG. 8, strip 37 is inserted between bottom edges 22, so that the top edge thereof projects interiorly of the covering.

FIG. 14 illustrates the form of the invention in which the body portions 21L, 21R are the same as in FIG. 1 and the tab 31 is likewise similar. However, the rubber band 33 is replaced by tapes or ties 51. Actually, the ties 51 are a single piece of material which pass inside the fold 32 of front tab 31. Preferably, bar tacks 52 are applied to hold the ties 51 in place. FIG. 15 illustrates how the ties 51 are brought around the sides of the shoe to the back and tied in a knot 53 behind the ankle of the wearer to hold the wrapping in place.

In the forms of the invention shown in FIGS. 3 and 14, no tape 37 is used. The entire device or parts thereof may be made conductive, as has been explained. On the other hand, the form of the invention shown in FIG. 14 may be made of nonconductive materials used where static electricity accumulation is not a hazard. It will be understood, however, a conductive strip similar to strip 37 of the preceding modification may be applied in the form of the invention of FIGS. 14 to 17, and, further, that the conductive feature may be eliminated in FIGS. 1 to 3.

FIG. 16 shows a further modified construction. In this form of the invention, the two halves 21L, 21R are made of a single piece of material which is joined in a fold 56 at the back edge 27a. Stitching 30a commences at point 29 and continues in the same manner as in FIG. 1, to an end point 55 at the adjacent rear corner 28.

Modification of FIG. 17 employs a single piece of material to form halves 21L, 21R. The two halves meet in a fold 57 at the bottom edge of the covering. Stitching 30b commences at point 29b and continues parallel to edges 24 and 26, terminating at the bottom point 60. A second stitching 30c commences at point 58 and the adjacent corner 28 continues around corner 28 and terminates at point 59 in the upper edge.

FIG. 18 eliminates all thread stitching in its construction. Adhesive material 71 may be applied at the seams, glue or pressure, or heat-sensitive material being suitable. If the material of construction of halves 21L, 21R is suitable (e.g., polyethylene) the halves may be joined at the seams by heat sealing. Tape 37 may likewise be caused to adhere to the covering by similar means.

Although the foregoing invention has been described in some detail, by way of illustration and example for purposes of clarity of understanding, it is understood that certain changes and modifications may be practiced within the spirit of the invention and scope of the appended claims.

What is claimed is:

1. A sanitary and protective covering for a conventional shoe inserted in said covering comprising initially flat right and left halves of flexible material each shaped with sole, back, toe, instep and top edges, said covering having a heel pocket at the juncture of said back and sole edges, said halves open at the top edges for insertion of said shoe and joined at the sole and toe edges and at least parts of said instep and back edges, said halves shaped to fit said shoe with said sole edges under the sole of said shoe, said halves extending up around the back, toe, instep and sides of said shoe to completely enclose said shoe, and means attached adjacent said toe edges and disposed and arranged to engage behind the ankle of the wearer of said shoe to draw said toe edges first forwardly of said shoe to seat the heel in said heel pocket and then to draw said toe edges and the forward ends of said sole edges upwardly and rearwardly over the instep of said shoe to conform said covering snugly to the length of said shoe, said means further securing said covering in place on said shoe.

2. A covering according to claim 1, in which said means comprises a folded over tab at said toe and tie means in said tab.

3. A covering according to claim 2, in which said tie means comprises a rubber band.

4. A covering according to claim 2, in which said tie means comprises a tape.

5. A covering according to claim 2, in which said tab comprises an integral extension of at least one said half at said toe.

6. A covering according to claim 2, in which said tab comprises a separate piece of material adhered to one side of said toe.

7. A covering according to claim 2, in which said tab comprises a separate piece of material adhered inside said toe between said halves.

8. A covering according to claim 1, in which said halves comprise separate pieces of material meeting along a longitudinal medial plane.

9. A covering according to claim 8, which comprises means adhering said halves together extending from the instep down said toe, along said sole portion and up said back portion.

10. A covering according to claim 9, in which said means comprises stitching.

11. A covering according to claim 9, in which said means comprises an adhesive.

12. A covering according to claim 1, in which said halves are formed of a single piece of material folded along said back edge and means adhering said halves together extending from the instep, down said toe, and along said sole edge and heel pocket.

13. A covering according to claim 1, in which said halves are formed of a single piece of material folded along said sole edge and first means adhering said halves together extending from the instep down said toe and second means adhering said halves together extending along said back edge and heel pocket.

14. A covering according to claim 1, in which at least a portion of said covering is electrically conductive to ground the wearer.

15. A covering according to claim 1, which further comprises a strip of conductive material extending along at least a portion of said sole edge and having an extended tab protruding rearwardly.

16. A covering according to claim 15, in which said strip is along the outside bottom edge of one said half.

17. A covering according to claim 15, in which said strip is inserted between said halves at said sole edge.

18. A covering of foldable material for a conventional shoe comprising a sole portion adapted to fit under the sole of said shoe, a heel pocket adapted to receive the heel of said shoe, and a back portion adapted to fit along the back of said shoe, a toe portion adapted to be drawn forwardly to seat said heel in said heel pocket and up over the toe of said shoe and back over the instep of said shoe to shorten the effective length of said covering to the length of said shoe, and means attached to said toe portion to extend around both sides of said covering and around the outside of said back portion to hold said covering in place on said shoe.

19. A covering according to claim 18, in which said means comprises a folded over tab at said toe and tie means extending around said back portion.

20. A covering according to claim 19, in which said tie means comprises a rubber band.

21. A covering according to claim 19, in which said tie means comprises a tape.

References Cited by the Examiner

UNITED STATES PATENTS

| | | | |
|---|---|---|---|
| 126,450 | 5/1872 | Drown | 36—9 |
| 726,778 | 4/1903 | Smith | 36—8 |
| 2,924,029 | 2/1960 | Rosen | 36—7.1 |
| 2,926,434 | 3/1960 | Morgan | 36—11 |
| 3,146,377 | 8/1964 | Whitton | 317—2 |

STEPHEN W. CAPELLI, *Primary Examiner.*

SAMUEL BERNSTEIN, *Examiner.*

D. YUSKO, *Assistant Examiner.*